4 Sheets--Sheet 1.

E. K. DAVIS, dec'd. SUSAN C. DAVIS, Adm'x.

Looms for Weaving Pile Fabrics.

No. 5,347. Reissued April 8, 1873.

Witnesses.
A. Ruppert
H. Bradford

Susan C. Davis
Admx of E. K. Davis
Inventor.
D. R. Holloway & Co
Attorneys

AM. PHOTO-LITHOGRAPHIC CO. N.Y. (OSBORNE'S PROCESS.)

4 Sheets--Sheet 2.

E. K. DAVIS, dec'd. SUSAN C. DAVIS, Adm'x.

Looms for Weaving Pile Fabrics.

No. 5,347. Reissued April 8, 1873.

Witnesses.
A Ruppert
O F Bradford

Susan C. Davis
Adm'x of E. K. Davis
Inventor.
D. P. Holloway & Co
Attorneys

AM. PHOTO-LITHOGRAPHIC CO. N.Y. (OSBORNE'S PROCESS)

4 Sheets--Sheet 3.

E. K. DAVIS, dec'd. SUSAN C. DAVIS, Adm'x.

Looms for Weaving Pile Fabrics.

No. 5,347. Reissued April 8, 1873.

Susan C. Davis
Adm'x of E. K. Davis

*Witnesses.*

W. Bradford
A. Ruppert.

*Inventor.*

D. P. Holloway & Co
Attys

AM. PHOTO-LITHOGRAPHIC CO. N.Y. (OSBORNE'S PROCESS)

E. K. DAVIS, dec'd. SUSAN C. DAVIS, Adm'x.

Looms for Weaving Pile Fabrics.

No. 5,347. Reissued April 8, 1873.

Witnesses.
W. Bradford
A. Ruppert.

Susan C. Davis Inventor.
Adm'x. of E. K. Davis
D. P. Holloway & Co
Attorneys

AM. PHOTO-LITHOGRAPHIC CO. N.Y. (OSBORNE'S PROCESS)

UNITED STATES PATENT OFFICE.

SUSAN C. DAVIS, OF NEW YORK, N. Y., ADMINISTRATRIX OF EZEKIEL K. DAVIS, DECEASED.

IMPROVEMENT IN LOOMS FOR WEAVING PILE-FABRICS.

Specification forming part of Letters Patent No. 86,651, dated February 9, 1869; reissue No. 5,347, dated April 8, 1873; application filed March 21, 1873.

*To all whom it may concern:*

Be it known that EZEKIEL K. DAVIS, of the city, county, and State of New York, did invent certain new and useful Improvements in Looms for Weaving Pile-Fabrics; and I do hereby declare that the following is a full, clear, and exact description of the same, reference being had to the annexed drawing making part of this specification, in which—

Figure 1:
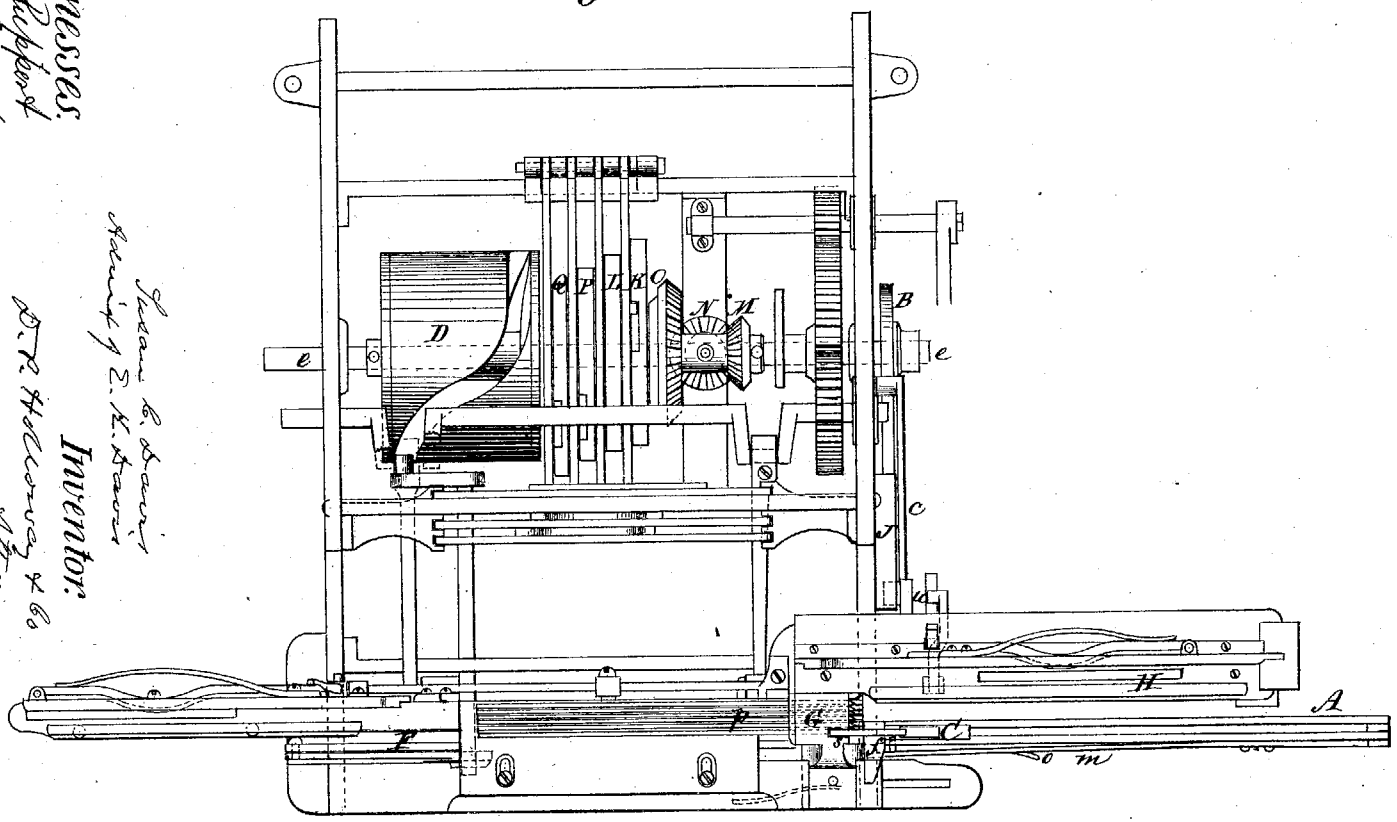
Figure 2:
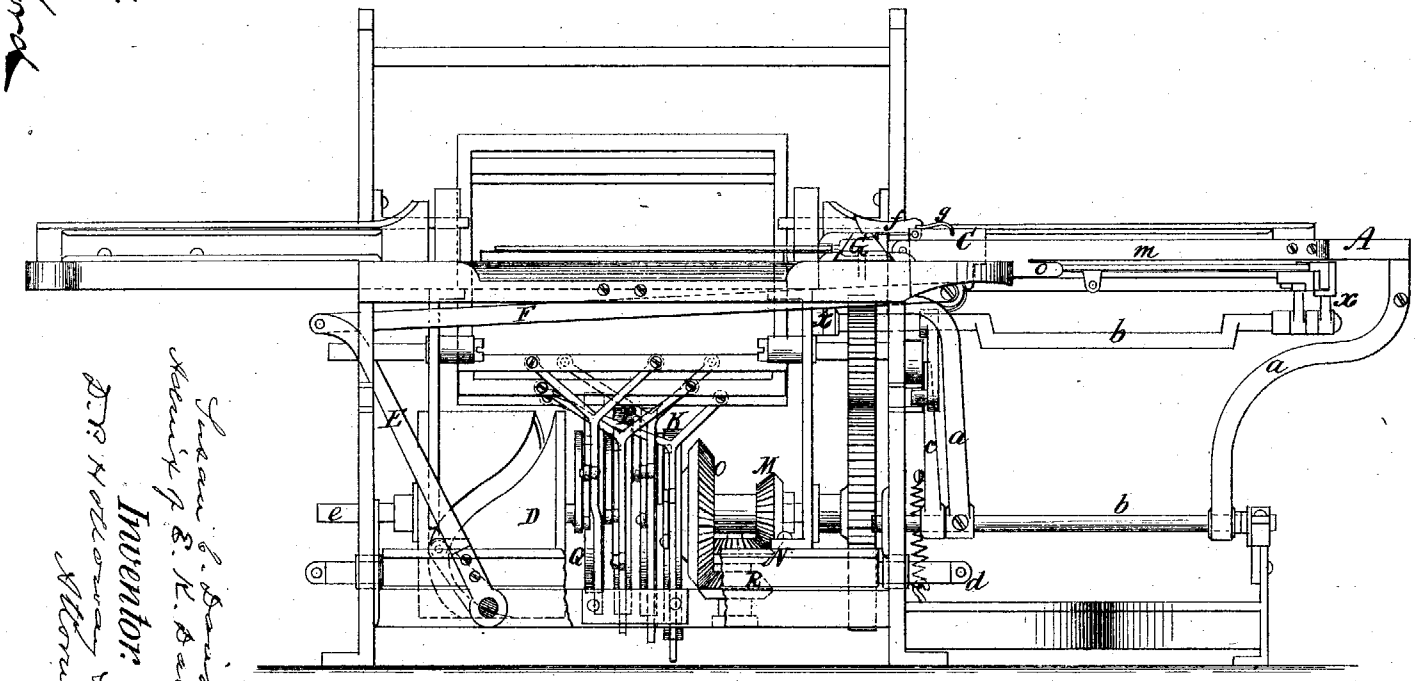
Figure 3:
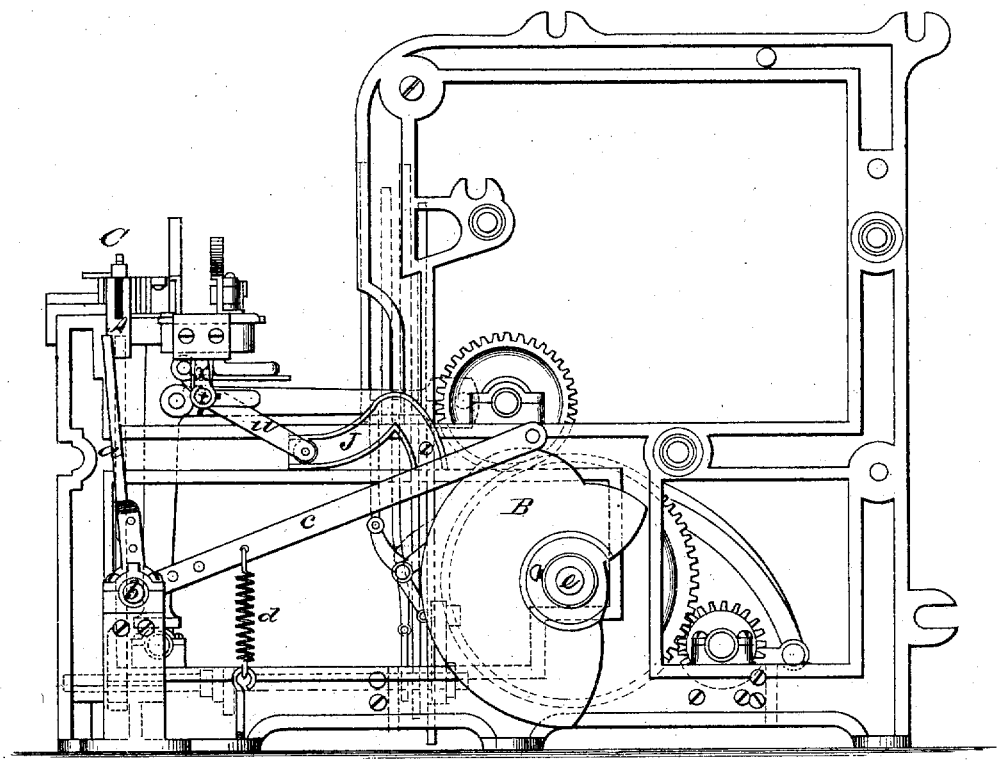
Figure 4:
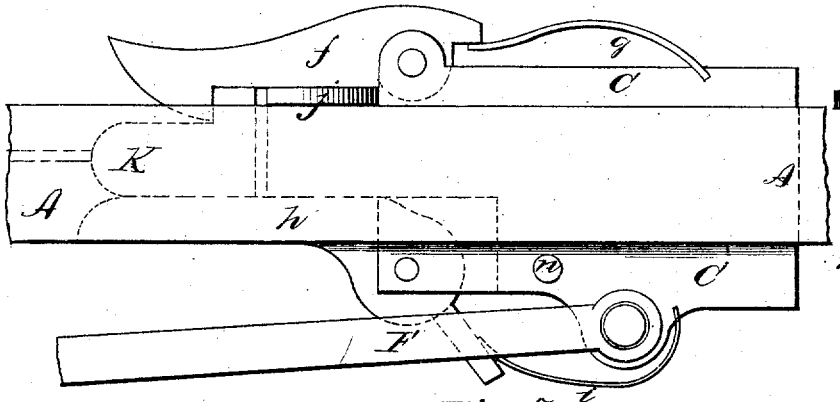
Figure 6:
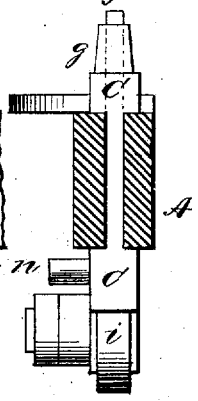
Figure 5:
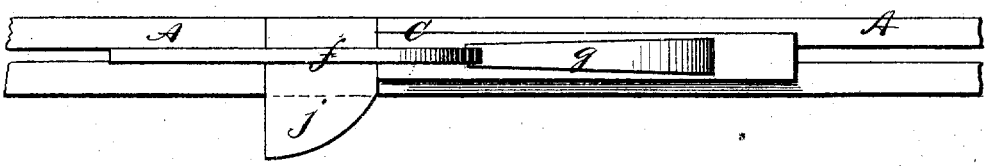
Figure 7:
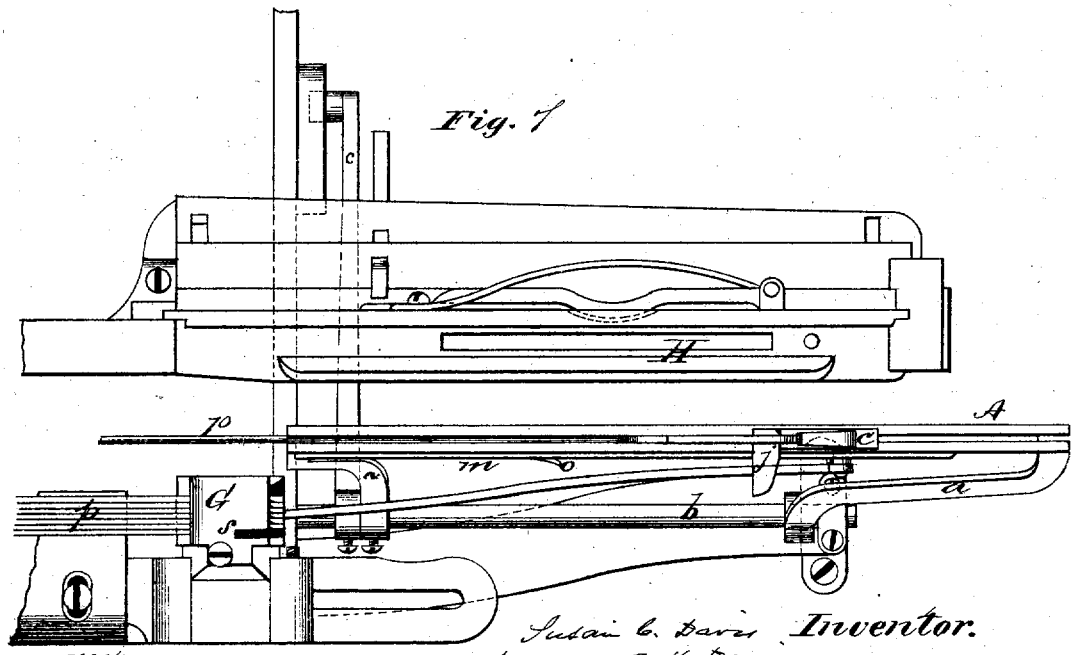

Figure 1 is a plan view of the loom. Fig. 2 is a front elevation. Fig. 3 is an end elevation. Fig. 4 is an elevation of the carriage which catches the wires and retains them while being drawn and reinserted. Fig. 5 is a plan and section of the same. Fig. 6 is an end elevation of the same. Fig. 7 is a detached plan of the sliding shuttle-box, wire-carrier, and wire-box.

The same letters are employed in all the figures in the designation of identical parts.

In the looms for weaving pile-fabrics heretofore in most common use, the wires are drawn from the pile in line with the pile; but when returned to the shed they are inclined at an angle to their position in the pile of the fabric, and have to be diverted and forced into their proper position. In some looms, however, the wires have been operated in parallel lines, an illustration of which may be found in the British patent of Weild, No. 505, A. D. 1855. In another British patent, that of Knowles, No. 2,258, of A. D. 1866, the wires were operated in parallel lines, but not in lines parallel to the wires when in the fabric. The points of distinction between this case and those shown in said patents will be made apparent in the following specification and claims.

This invention is distinguished from all the looms heretofore known or used for the same purpose in the following respects: First, that it combines, with a wire-carrier oscillating upon an axis parallel to that of the lay, (not coincident or in line with it, as is the case in said Weild's patent,) a reciprocating carriage traveling upon the wire-carrier, and provided with a latch, and operating to withdraw the wires successively from the pile, and returning them to the shed without in the meantime becoming disengaged from the wire; secondly, that it combines, with a wire-carrier oscillating upon an axis parallel to that of the lay, a reciprocating carriage traveling upon such carrier, and having a latch attached thereto, and a plate arranged to raise the latch and sustain it while it is passing over the heads of the wires, after delivering the wire to the shed, and in returning to seize the head of the wire in the wire-box furthest from the lay; also, in certain novel combinations of parts, which will be hereinafter designated and claimed.

The following description will enable persons skilled in the art to construct and operate this improved loom.

A is a wire-carrier, in which the wires slide, and by which they are guided while being withdrawn and inserted. This wire-carrier is supported by the arms *a a*, which are attached to the rocker-shaft *b*, parallel but not coincident with the axis of the lay, which has suitable bearings on the frame of the loom. The motion required to transfer the wire, after it is drawn from the line of the cloth, to the proper position for entering the shed, is imparted to the carrier A by means of the cam B acting upon the lever *c*, which is secured at one end to the rocker-shaft *b*. The spiral spring *d* serves to hold the roller of the lever *c* in contact with the face of the cam B during regular action, and, in case of any obstruction to the backward motion of the carrier, permits said bar to remain forward, and prevents breakage. The cam B is of such construction as to allow the carrier A to remain stationary while the wire is being drawn from the cloth. This cam is secured to one end of the shaft *e*, which is operated by suitable gearing connecting it with the driving pulley or gear. C is the carriage for inserting and withdrawing the wires, arranged to traverse the carrier A. This carriage is provided with a latch, *f*, spring *g*, lever *h*, spring *i*, and plate *j*, which securely hold the wire while being withdrawn and inserted. A section of the wire, with a suitable head, *k*, is shown in Fig. 4, and it will be seen that the latch *f*, held in position by the spring *g*, engages the head for the purpose of withdrawing the wire, while the lever *h*, held by the spring *i*, presses against the lower edge of the wire-head *k*, and holds it in its proper position in the wire-carrier. When the wire is driven into the shed the plate *j* presses against the back of the wire-head *k*, and the plate also evens the heads of the wires in the box. The traverse-motion required to draw and insert the wires is imparted to the carriage by means of the cam D acting upon the lever E, which transmits the motion to the carriage through the arm F, one end of which is secured to the lever E, the other to the carriage. In order to support the end of the wire when it is drawn, a pin, *l*, is inserted in the carrier A near the end next to the body of the loom. As this pin, should it remain at all times in the carrier, would interfere with the passage of the carriage when it is driven up to insert the wire, it is secured to one end of the long spring *m* on the side of the bar, and, as the carriage is moved forward to drive the wire, a pin or stud, *n*, attached to said plate, comes in contact with the spring *m* at a point shown at *o* in Figs. 1, 2, 7, and 8, presses it out sufficiently to remove the pin *l* and allow the carriage to complete its forward motion without obstruction. When the carriage is traversing backward and drawing the wire the stud *n* relieves the spring *m* at the point *o*, before mentioned, and the pin *l* is moved to support the end of the wire as it comes from the cloth. The positions of the spring *m* and pin *l*, both when the carriage and its connections are in position to seize a wire and when the wire is being driven into the shed, are, respectively, shown in Figs. 7 and 8. *p p*, shown in Figs. 1, 7, and 8, represent the wires in the cloth or pile. G is the covering-plate for the wire-box. It assists in holding the heads of the wires in position, raises the latch of the carriage to disengage the wire, and it is also provided with a slot, *s*, to allow the latch to engage the wire-heads. Just before the carriage completes its forward movement to drive the wire into the shed, the latch *f* strikes the top plate of the wire-box, riding up on the same, and releasing the head of the wire; and in the return of the carrier A to the line of drawing, the latch slides over the plate G to the slot *s*, which it enters to seize upon the wire-head presented there.

In the proper working of improved wire-motions for pile-fabrics, it has been considered necessary to detach the shuttle-box from the lay on the side of the loom where the wires are drawn and inserted in order to give the wire-motion room for its operations. A part of my improvement consists in so arranging the shuttle-box H as to slide upon the lay, so that when it is necessary to throw and receive the shuttle the box is in line with the race of the lay, the same as though it were secured to it; but when the lay is thrown forward to beat up the filling, the box is not carried with it, but retarded in its motion sufficiently to give the wire-motion free play. This is accomplished by grooving the lay transversely on the side required and fitting the shuttle-box H with tongues to work in the grooves. The box is secured to arms *x x* connecting with the rocker-shaft *t*, which has suitable bearings or supports attached to the lay. The arm or lever *u* is secured at one end to the rocker-shaft *t*, and at the other end supports a stud and roller, which work in the cam-path J, which is attached to the frame of the loom, as shown in Fig. 3. The cam-path J is of such peculiar construction as to cause the arm or lever *u*, through its connection with the rocker-shaft *t* and the lay, to allow the shuttle-box H to move with the lay long enough to throw and receive the shuttle, and then gradually retard its motion while the lay goes forward to complete its beat, and, as the lay begins to recede, gradually increase the backward motion of the box until it is again in line with the race of the loom, when it works with the lay the same as though it were secured to it until it again arrives at the point of retarding on the forward beat.

The common method of operating cams for working the heddle-frames for the several warps of pile-fabrics has been to secure the cams all to one shaft, and the different motions required are attained by the construction of the cams either double or single, as the case requires.

My improvement consists in working the fine warp or cloth-making heddles by cams K L driven by the compound bevel-gears R O, the cams K L and gear O being secured to a sleeve which revolves on the shaft *e* in a direction opposite to that of the shaft *e*, making one revolution to two of said shaft. The cams P Q, which operate the pile and stuffing warps, are secured to the main shaft *e*, operated through gear M N, which cause said cams to make two revolutions to one of the cams K L in opposite directions.

What is claimed as the invention, and desired to be secured by Letters Patent, is—

1. In combination with a wire-carrier oscillating upon an axis parallel to that of the lay, but not coincident with it, a reciprocating carriage provided with a latch traveling upon the wire-carrier and operating to withdraw the wires successively from the pile and return them to the shed without, in the meantime, becoming disengaged from the wire.

2. The combination, with a wire-carrier oscillating upon an axis parallel to that of the lay, and a reciprocating carriage provided with a latch, traveling upon such carrier, of a plate arranged to raise the latch and sustain it while passing over the heads of the wires.

3. In combination with a latch to draw the wires from the pile, having a reciprocating movement longitudinally and transversely, a plate or its equivalent placed so as to release the latch from the inserted wire and support it while passing from one side to the other of the row of wires.

4. In combination with the wires and reciprocating carriage, an automatically-adjustable pin, supporting the end of the wire drawn from the wire-box, and which is retracted through the side of the wire-carrier as the carriage approaches, so as not to interfere with its movements.

5. In combination with the wire-carrier A, the carriage C, latch *f*, spring *g*, lever *h*, spring *i*, and plate J.

6. The sliding shuttle-box H, combined with arms *x x*, rocker-shaft *t*, lever *u*, and cam-plate J.

7. The cams K L and gear O arranged on a sleeve surrounding the shaft *e*, in combination with said shaft, cams P Q, and operating-gear and heddles.

In testimony whereof I have signed my name to the foregoing specification in the presence of two subscribing witnesses.

SUSAN C. DAVIS,
*As Administratrix of the estate of Ezekiel K. Davis, deceased.*

Witnesses:
JOHN CROSSLEY, Jr.,
HENRY BADENN.